(12) United States Patent
Sporn

(10) Patent No.: US 10,631,523 B2
(45) Date of Patent: Apr. 28, 2020

(54) THREE POINT CONTROL HARNESS

(71) Applicant: Joseph S Sporn, New York, NY (US)

(72) Inventor: Joseph S Sporn, New York, NY (US)

( * ) Notice: Subject to any disclaimer, the term of this patent is extended or adjusted under 35 U.S.C. 154(b) by 642 days.

(21) Appl. No.: 15/071,032

(22) Filed: Mar. 15, 2016

(65) Prior Publication Data

US 2017/0265437 A1    Sep. 21, 2017

(51) Int. Cl.
*A01K 27/00*    (2006.01)

(52) U.S. Cl.
CPC .................. *A01K 27/002* (2013.01)

(58) Field of Classification Search
CPC ............ A01K 27/00; A01K 27/001002; A01K 27/003; A01K 27/004; A01K 27/005; A01K 27/002
USPC ....... 119/712, 769, 770, 792, 864, 858, 863, 119/856; 24/182
See application file for complete search history.

(56) References Cited

U.S. PATENT DOCUMENTS

| | | | | |
|---|---|---|---|---|
| 1,410,573 A * | 3/1922 | Jensen | ...................... | B68B 1/02 54/24 |
| 1,556,362 A * | 10/1925 | Silbert | ...................... | B68B 1/02 54/24 |
| 5,370,083 A * | 12/1994 | Sporn | .................. | A01K 27/002 119/864 |
| 5,503,113 A * | 4/1996 | Knight | ................. | A01K 27/002 119/792 |
| 5,613,467 A * | 3/1997 | Arakawa | .............. | A01K 1/0272 119/771 |
| 5,713,308 A * | 2/1998 | Holt, Jr. | ............... | A01K 27/002 119/792 |
| 6,314,915 B1 * | 11/2001 | Pope | ..................... | A01K 27/002 119/712 |
| 6,374,771 B1 * | 4/2002 | Zwickle | ............... | A01K 1/0353 119/28.5 |
| 6,401,666 B1 * | 6/2002 | Kircher | ................ | A01K 27/002 119/792 |
| 6,694,923 B1 * | 2/2004 | Fouche | ................ | A01K 27/005 119/792 |
| 6,708,650 B1 * | 3/2004 | Yates | ................... | A01K 27/002 119/712 |
| 7,165,511 B1 * | 1/2007 | Brezinski | ............. | A01K 27/002 119/792 |
| 8,051,808 B2 * | 11/2011 | Mugford | .............. | A01K 27/002 119/771 |
| D652,581 S * | 1/2012 | Evans | ......................... | D30/152 |

(Continued)

*Primary Examiner* — Christopher D Hutchens
(74) *Attorney, Agent, or Firm* — Hanes & Bartels LLC

(57) ABSTRACT

The canine three point control harness of the present invention comprises a foreleg crotch loop, that with appropriate tension from any one of three control points, applies pressure to the crotch pits of the dog's forelegs. A pair of shoulder straps support a connector ring disposed over the upper forechest of the dog which ring forms a forward control point that is connected to the foreleg crotch loop and, when attached to a leash, can apply pressure to the foreleg pits. Over the withers of the dog the shoulder straps are twisted together to form a handle, the rear portion of which is connected to that portion of the crotch loop which terminates over the withers and provides another control point for increasing the pressure on the foreleg pits. Lifting of either end of the twisted handle communicates tension to the crotch loop and consequent crotch pressure.

7 Claims, 5 Drawing Sheets

(56) References Cited

U.S. PATENT DOCUMENTS

| | | | |
|---|---|---|---|
| 2008/0047501 A1* | 2/2008 | Madere | A01K 27/002 119/863 |
| 2009/0320418 A1* | 12/2009 | Gibbons | B68B 1/02 54/24 |
| 2010/0242861 A1* | 9/2010 | Arreola | A01K 27/002 119/864 |
| 2011/0061348 A1* | 3/2011 | Sierra | B68B 1/02 54/24 |
| 2014/0020634 A1* | 1/2014 | Kissel, Jr. | A01K 27/002 119/712 |
| 2015/0007778 A1* | 1/2015 | Yamin | A01K 27/002 119/792 |

* cited by examiner

THREE POINT CONTROL HARNESS

BACKGROUND

To avoid choking and possible damaging pressure on a dog's head, neck and spine that results from controlling a dog with a neck collar and attached leash, many harness designs have been implemented that apply control pressure to parts of the dog other than the neck, U.S. Pat. No. 7,757,641 to Worden discloses a harness that relies on a leash or handle disposed over the dog's withers to exert distributed pressure across the animal's body without putting strain on the head, neck or spine.

U.S. Pat. No. 5,359,964 to Sporn illustrates a harness that, in response to strain on a connected leash, harness straps ride up on the respective foreleg crotches of the dog and impose pressure on the highly sensitive foreleg pits, whereby the dog, in order to relieve the resultant discomfort, relaxes the strain.

Published U.S. Patent application No. 2008/0105216 to Sporn discloses a harness that applies inwardly directed pressure to the body of the dog as a result of tension in the connected leash.

U.S. Pat. No. 7,165,511 to Brezinski teaches a harness that applies pressure to the rib cage of a dog in response to force exerted on the leash by the dog.

All of these and other similarly purposed dog harnesses either require extensive and complicated strap and buckle construction or they fail to deliver the intended control performance. Furthermore, the harnesses of the prior art rely on control from a single point on the harness, that is, from a leash attached to the harness at a single point.

It is therefore the primary object of the present invention to provide a canine harness that applies the same foreleg crotch control pressure from any one of three different points on the harness, that is, from a leash attached to the harness over the dog's withers, from a leash attached to the harness over the dog's chest and from a handle positioned over the dog's withers.

It is a further object of the invention to provide an effective control harness that is easy to install and is simple in construction.

Other and further objects, features and advantages of the present invention are seen in the following detailed description, taken together with the attached drawings.

SUMMARY OF THE INVENTION

The canine control harness of the present invention comprises a foreleg crotch loop that with appropriate tension from any one of three control points applies pressure to the crotch pits of the dog's forelegs. A pair of shoulder straps support a connector ring disposed over the upper forechest of the dog which ring forms a forward control point that is connected to the foreleg crotch loop and, when attached to a leash, can apply pressure to the foreleg pits. Over the withers of the dog the shoulder straps are twisted together to form a handle the rear portion of which is connected to that portion of the crotch loop which terminates over the withers and provides another control point for increasing the pressure on the foreleg pits. Lifting of either end of the twisted handle communicates tension to the crotch loop and consequent crotch pressure.

DETAILED DESCRIPTION

The primary element of control in the present harness is the foreleg crotch loop which, when one of the control points provides tension on the sides of the loop, the loop tightens and rides up into the crotch between the brisket and the forelegs and applies pressure to the highly sensitive foreleg pits, inducing the dog to relieve the pressure by relaxing the strain on the control point.

Figure 1:
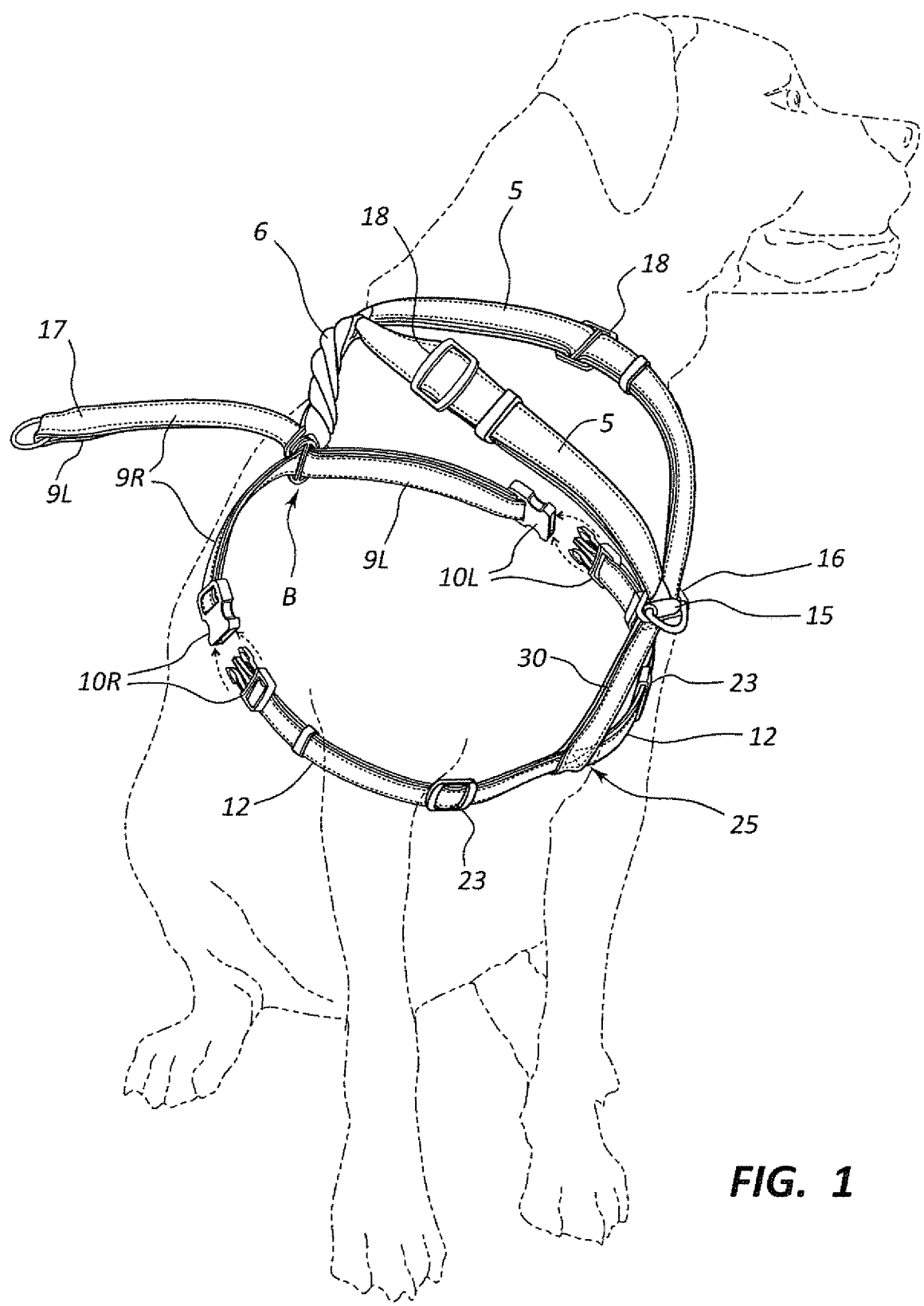
FIG. 1 is a perspective view of the whole control harness with a dog shown in dotted lines to orient the position of the harness with respect anatomical parts of a dog.
Figure 2:
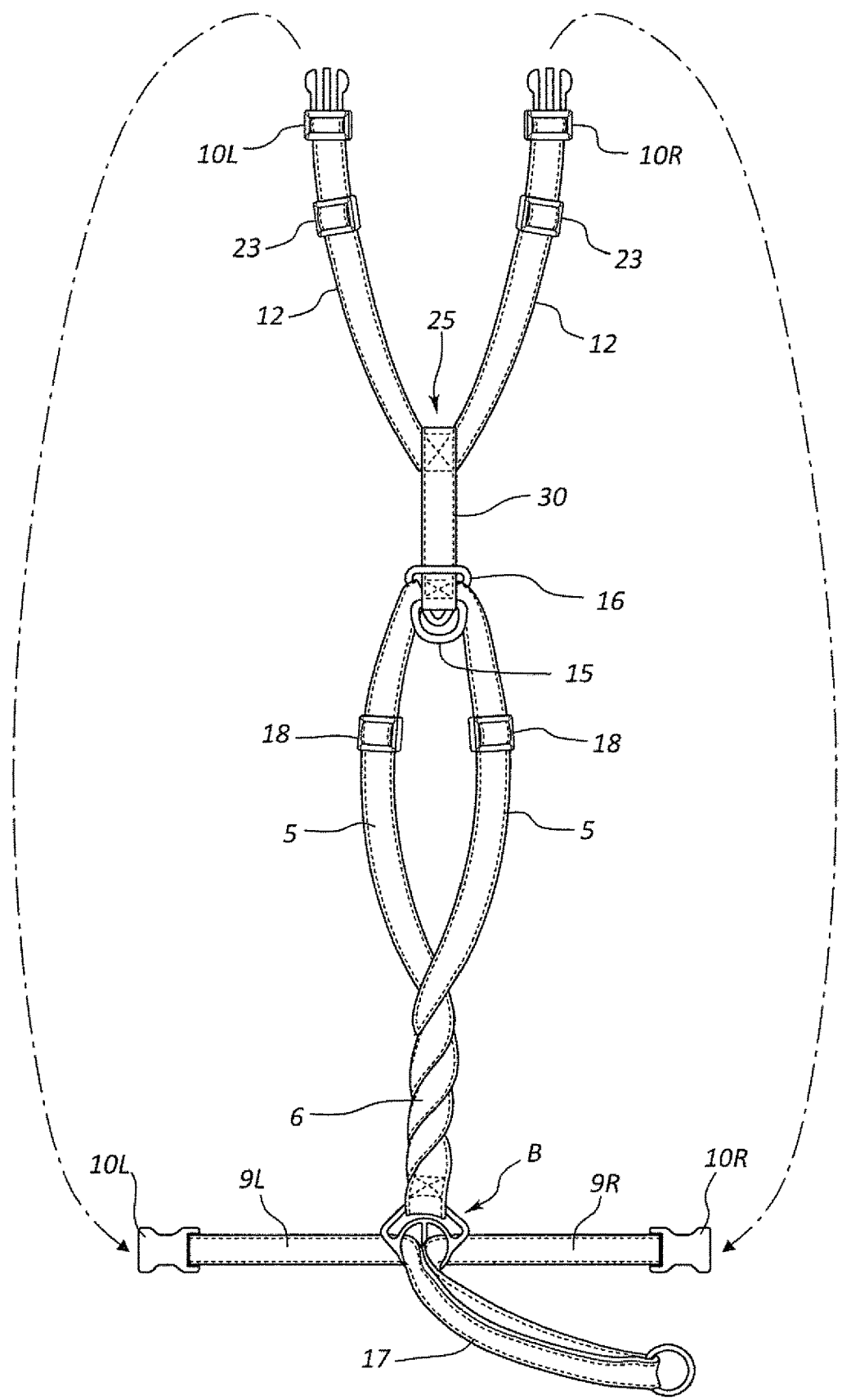
FIG. 2 is a plan view of the control harness.
Figure 3:
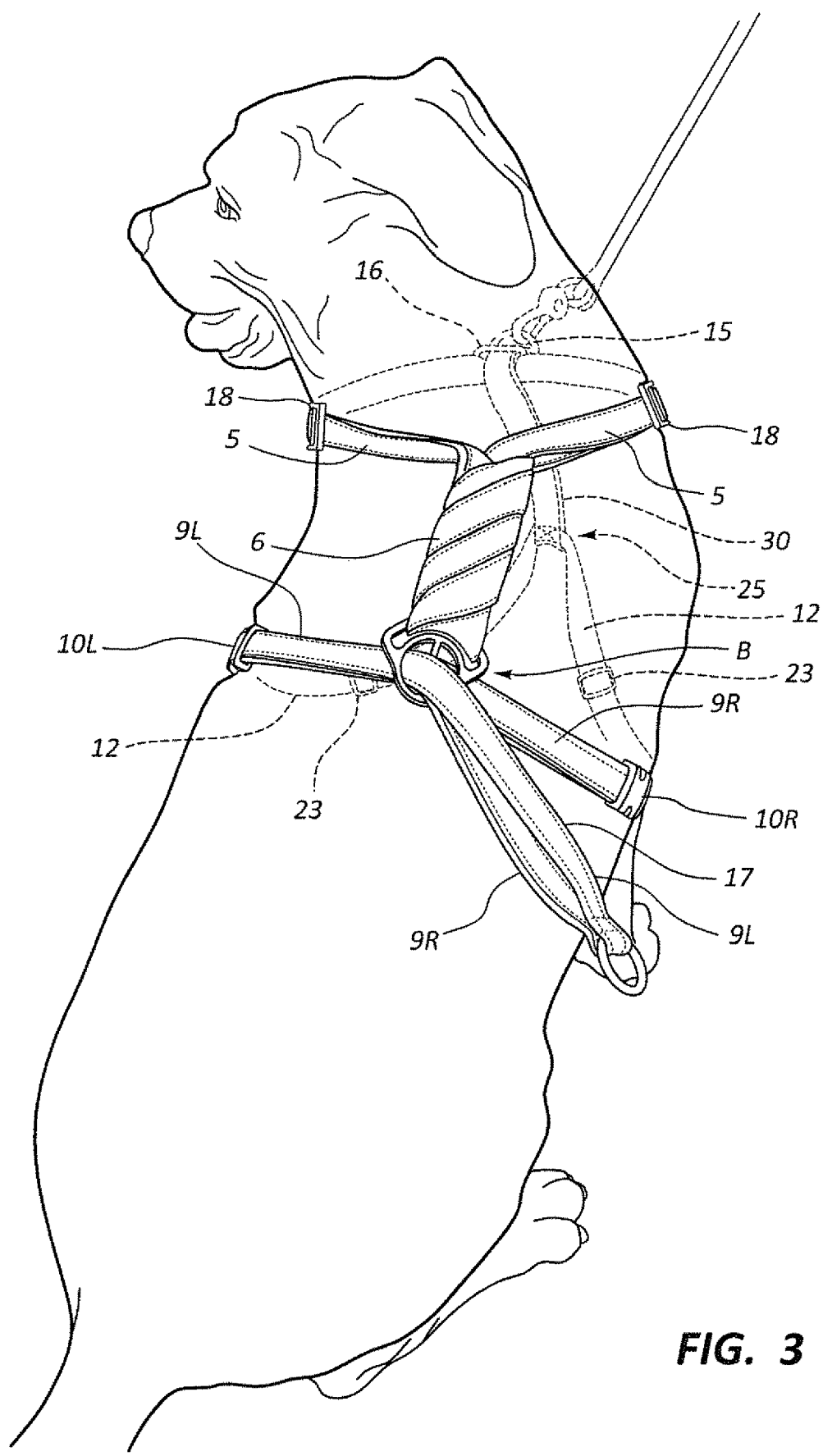
FIG. 3 is a dorsal view of a dog wearing the harness of the present, invention with the fore part of the harness and the first control point shown in dotted lines.

The crotch loop includes straps 12 that are joined at a junction 25 disposed over the lower forechest of the dog. After passing through the respective crotches of the forelegs the straps 12 are connected by buckles 10L and 10R to the respective ends of a chest strap having sections 9L, 9R and 17, as shown in. FIG. 2. The loop passes from the crotch areas across the left and right rib cages and upwardly onto the dog's withers where chest strap sections 9L and 9R pass through the second and third holes of a three ring connector B, positioned over the withers, and continue to extend outwardly to form a closed loop 17 which is adapted for connection to a leash that is a first point of control.

The junction 25 in the foreleg loop is maintained over the lower forechest by a combination of elements including shoulder straps 5 which are respectively positioned over the dog's left and right shoulders. The first ends of the straps 5 are passed through a triangular ring 16 disposed over the upper forechest and looped back over the straps to engage length adjusting slides 18 carried on each of the shoulder straps 5. The ring 16 is positioned above the junction 25 from which junction an attached control strap 30 depends. The free end of the control strap 30 passes through the triangular ring 16 and terminates with a D ring 15 that prevents the terminal end of the control strap from going back through the triangular ring 16. The D ring 15 also provides a second control point by serving as another attachment point for a leach, as shown in FIG. 4.

Figure 4:
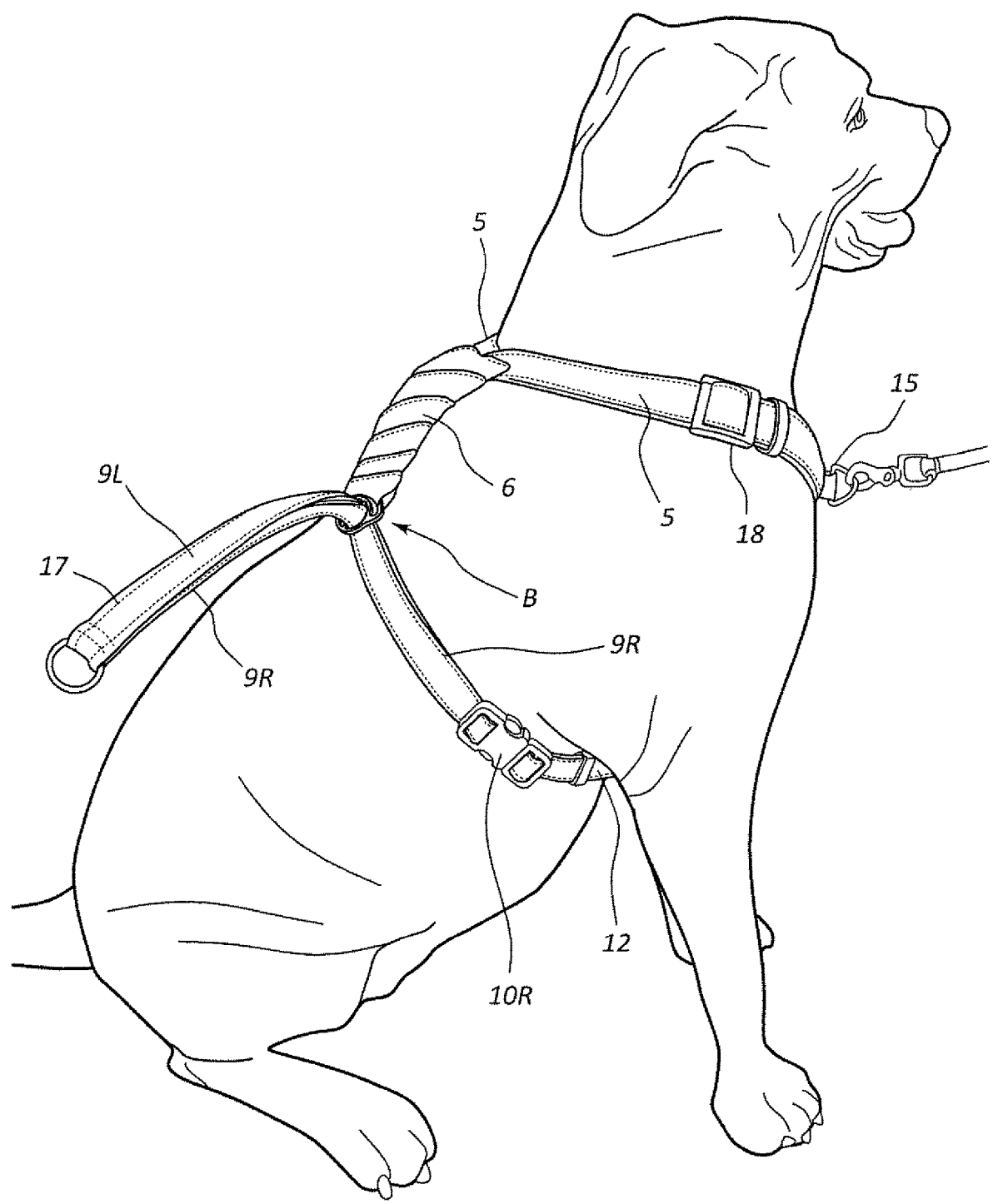
FIG. 4 is a side view of a dog wearing the harness of the present invention with a leash attached to a first control point on the chest of the dog.
Figure 5:
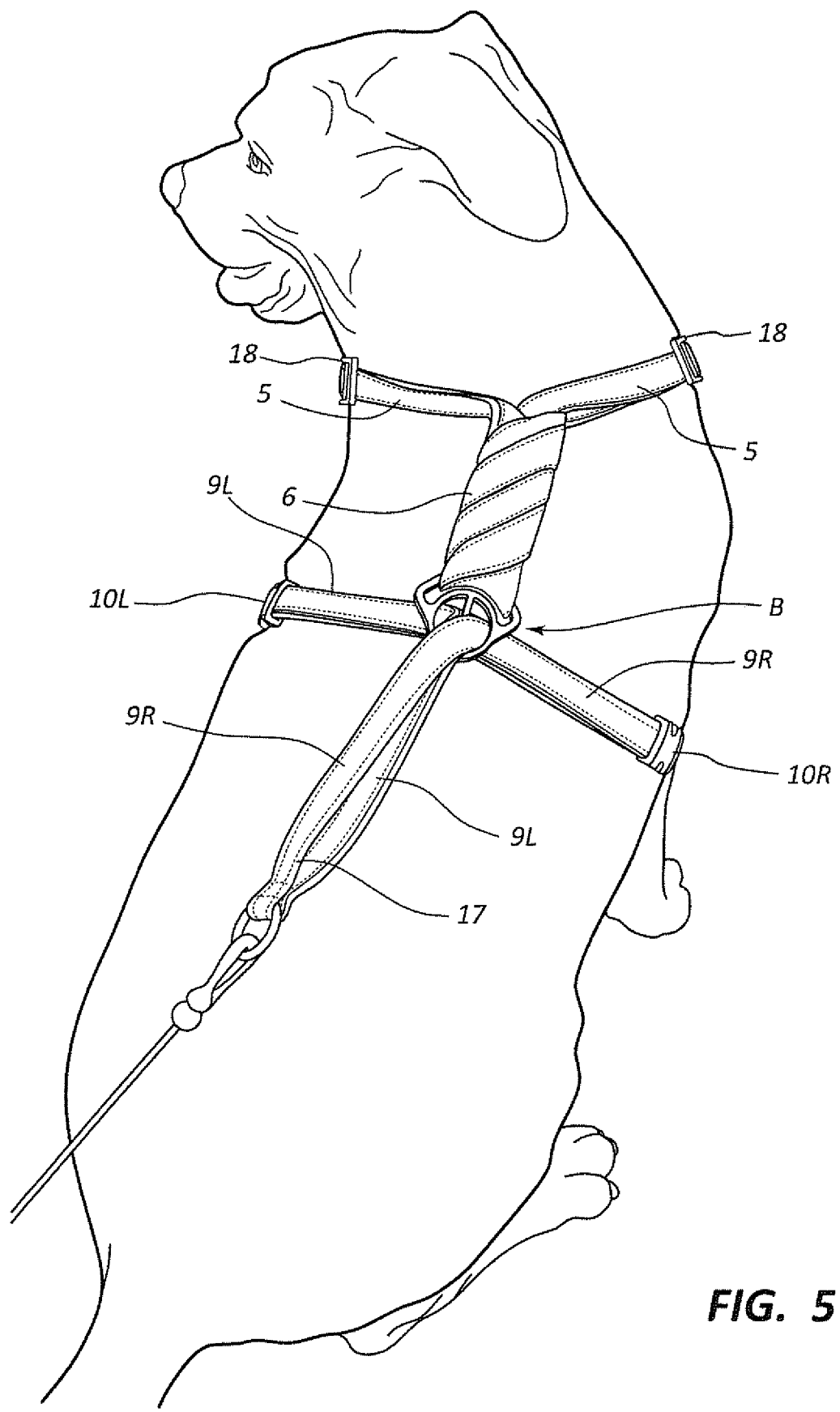
FIG. 5 is a dorsal view of a dog wearing the harness of the present invention with a leash attached to the second control point, that is, the portion of the foreleg crotch loop that is extended through the withers connector ring.

The second ends of the shoulder straps 5 are twisted together to form a handle 6 positioned over the dog's withers, as shown in FIGS. 4 and 5. At the terminal end of the twisted portion of the straps the second ends are interconnected by stitching after the ends are inserted into the first hole of the three hole connector B, thus securing the rear terminal end of the handle to the three hole connector.

In operation, the handle 6 acts as the third control point of the harness. Lifting the rear portion of the handle 6 lifts the three hole connector B and provides tension on the foreleg crotch loop. Lifting the forward end of the handle 6 provides tension on the shoulder straps 5 and consequent rearward movement of the triangular ring 16 which tensions the trapped control strap 30, pulling on the straps 12 of the foreleg crotch loop to tighten the loop and apply pressure to the foreleg pits.

I claim:

1. A control harness for dogs comprising,
a pair of foreleg crotch straps having distal and proximal ends where the distal ends are interconnected in a junction over the lower forechest of a dog and where the proximal ends each include a buckle half,
a triangular connector disposed over the upper forechest of a dog,
a three hole connector disposed over the withers of a dog and having first, second and third holes,
a pair of strap length adjusters
a pair of side-by-side opposing shoulder straps having first and second ends where the first ends are twisted together and affixed to the first hole of the three hole connector and where the second ends pass through the triangular connector and are folded back upon themselves to engage the respective strap length adjusters that are carried by the shoulder straps,
a control strap having first and second ends where the first end is attached to the junction and the second end passes through the triangular connector and includes an attached connector ring sized to prevent the control strap from retreating back through the triangular connector,
a chest strap having first and second ends, including buckle halves adapted for interconnection with the buckle halves of the foreleg crotch straps, where the center section of the chest strap passes through the second and third holes of the three hole connector to form a closed loop extending outwardly from the connector.

2. A three point control harness for dogs comprising,
a multi-hole connecting ring disposed over the dog's withers,
a foreleg crotch loop extending from a junction over the lower forechest thru the crotches between the brisket and the respective forelegs of the dog and over the respective rib cage areas and through the connecting ring and extending outwardly therefrom, forming a closed loop,
a connecting ring disposed over the dog's upper forechest,
a pair of shoulder straps which engages the connecting ring and each having terminal ends that are twisted together to form a handle, said ends being secured to the multi-hole connecting ring, and
means connected to the junction and in slidingly engagement with the connecting ring for drawing the junction and the connecting ring together.

3. The harness of claim 2 where the means connected to the junction includes a control strap having a first end attached to the junction and having a second end, including a D ring, for attachment to a leash.

4. The harness of claim 3 where the foreleg crotch loop includes a buckle intermediate the junction and the multi-hole connecting ring.

5. The harness of claim 4 where the multi-hole connecting ring is a three hole ring having first, second and third holes and where the twisted terminal ends of the shoulder straps are attached to the first hole.

6. The harness of claim 5 where one side of the foreleg crotch loop passes through the second hole and the other side of the loop passes through the third hole forming a doubled back portion of the loop and further including a ring carried by the doubled back portion for attachment of a leash.

7. A control harness for dogs, comprising:
a crotch loop that circumscribes a dog's chest behind the dog's forelegs,
a handle having first and second terminal ends disposed medially over the dog's withers,
left and right shoulder straps which converge over the dog's withers and form the first terminal end of the handle and which shoulder straps comprise distal ends that terminate in a junction over the forechest of the dog,
a forechest strap that interconnects the crotch loop and the junction of the distal ends of the left and right shoulder straps,
means for slidingly interconnecting the crotch loop and the second terminal end of the handle,
a ring carried by the crotch loop for the interconnecting a leash, and
a ring for interconnecting a leash attached to the distal ends of the shoulder straps at the junction.

* * * * *